(No Model.) 2 Sheets—Sheet 2.
E. S. BARROWS.
HOOF SPREADING HORSESHOE.
No. 604,014. Patented May 17, 1898.
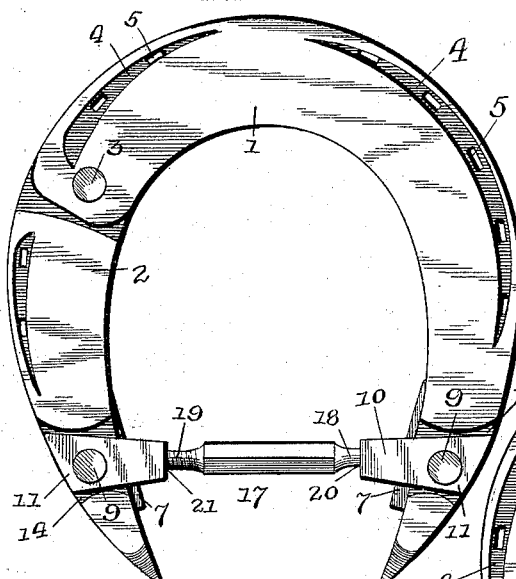
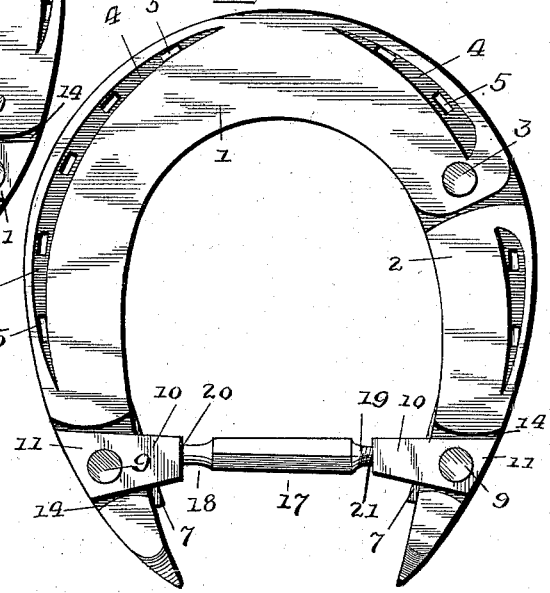
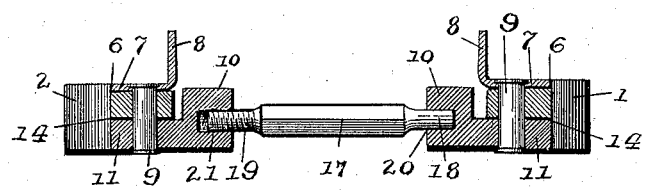
Witnesses
O. J. Young
J. F. Riley
Inventor:—
Elvin S. Barrows,
By his Attorneys,
C. A. Snow & Co.

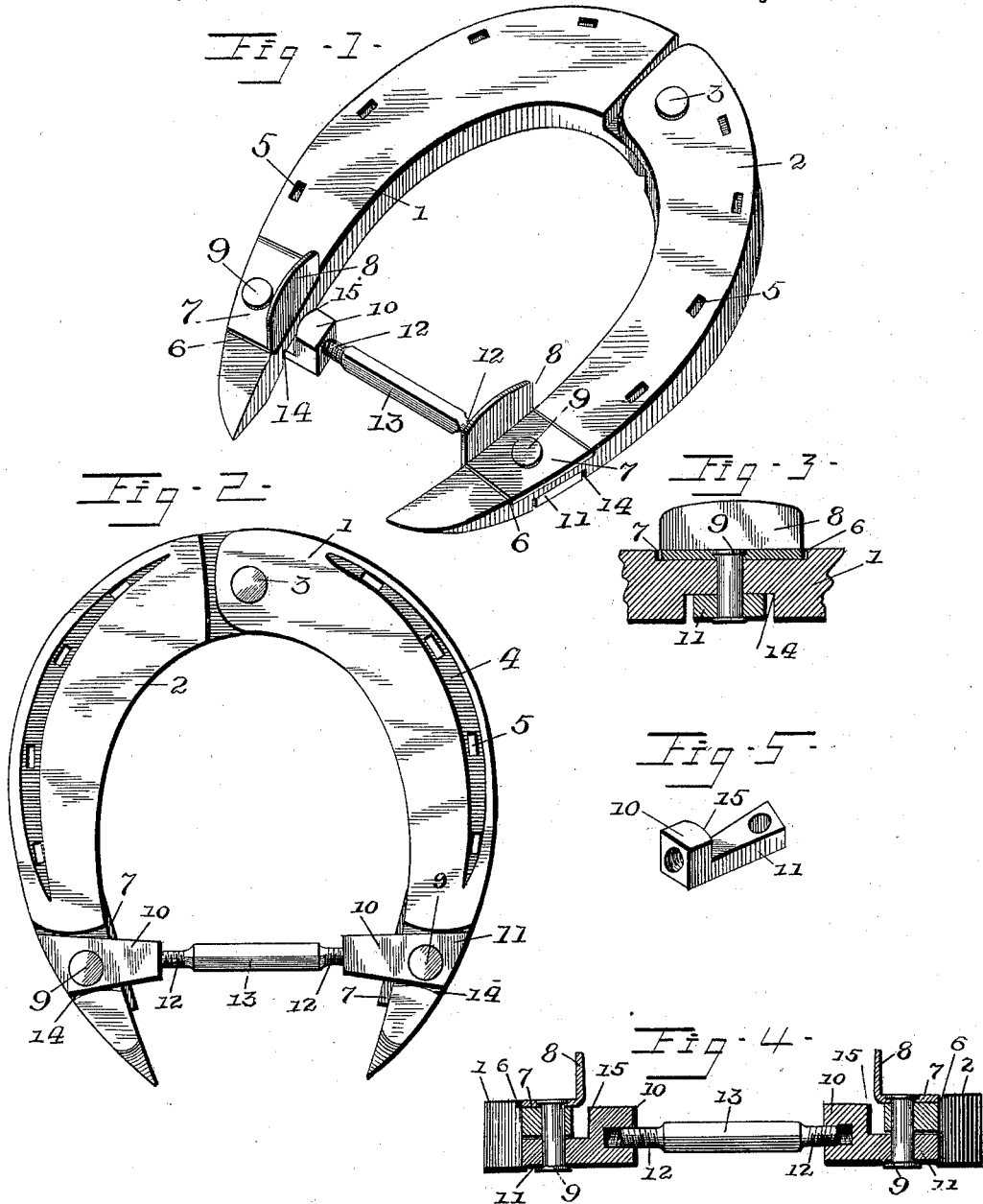

UNITED STATES PATENT OFFICE.

ELVIN S. BARROWS, OF CLARENDON, VERMONT.

HOOF-SPREADING HORSESHOE.

SPECIFICATION forming part of Letters Patent No. 604,014, dated May 17, 1898.

Application filed September 22, 1897. Serial No. 652,597. (No model.)

*To all whom it may concern:*

Be it known that I, ELVIN S. BARROWS, a citizen of the United States, residing at Clarendon, in the county of Rutland and State of Vermont, have invented a new and useful Horseshoe, of which the following is a specification.

The invention relates to improvements in horseshoes.

The object of the present invention is to improve the construction of expansible horseshoes and to provide a simple, inexpensive, and efficient one capable of ready adjustment to spread a hoof to the desired extent and adapted to conform to the configuration of the hoof to which it is applied.

A further object of the invention is to provide an adjusting device which will not project below the lower face of the shoe and be liable to be broken or otherwise injured by contact with the road and which will adjust itself to the position of the parts of the shoe in order to prevent binding.

Another object of the invention is to enable the sides of the shoe to bear against a hoof at the back thereof and to conform to the position of the opposite walls of the hoof while expanding the shoe, so that the engagement of the shoe with the hoof will be perfect at all times.

The invention consists in the construction and novel combination and arrangement of parts, as hereinafter fully described, illustrated in the accompanying drawings, and pointed out in the claims hereto appended.

In the drawings, Figure 1 is a perspective view of a horseshoe constructed in accordance with this invention. Fig. 2 is a reverse plan view of the same. Fig. 3 is a transverse sectional view. Fig. 4 is a detail sectional view illustrating the manner of mounting the pivoted socket and the pivoted plate. Fig. 5 is a detail perspective view of one of the pivoted sockets. Figs. 6 and 7 are plan views illustrating modifications of the invention. Fig. 8 is a transverse sectional view.

Like numerals of reference designate corresponding parts in the several figures of the drawings.

1 designates a horseshoe composed of sections 1 and 2, connected at their contiguous ends by a pivot 3 and having their pivoted ends recessed and overlapped to bring their upper and lower faces in the same plane.

The sections 1 and 2 are provided with the usual grooves 4 and nail-holes 5, and they are recessed at their upper and lower faces, near their rear ends. The upper recesses 6 receive plates 7, which are substantially L-shaped in cross-section, being provided at their inner edges with upwardly-extending flanges 8, and these upwardly-extending flanges are adapted to bear against the rear walls of a hoof in the spaces between the said walls and the frog. The horizontal portions 7 of the plates have their upper faces arranged flush with the upper faces of the sides or sections of the horseshoe and are secured to the same by pivots 9, which pass entirely through the shoe and also serve as means for connecting sockets 10 to the sides of the shoe.

The sockets 10, which are provided with outwardly-extending horizontal flanges 11, are substantially L-shaped in longitudinal section and have right and left hand screw-threads and are engaged by correspondingly-threaded portions 12 of an adjusting-bar 13. The adjusting-bar 13, which is disposed transversely of the rear portion of the shoe, has a polygonal central portion and is adapted to be rotated to move the sides of the shoe simultaneously inward or outward.

The outwardly-extending horizontal flanges 11 project from the lower portions of the sockets and are received within lower recesses 14 of the sides of the shoe, so that the lower faces of the sockets are located in the same plane as the lower face of the shoe, and the adjusting device does not project below the shoe and is thereby housed between the sides of the same and is prevented from being broken or otherwise injured through coming in contact with a hard road-bed.

The upper portions of the sockets are rounded at their inner faces at 15, and this, together with the pivotal connection of the flanges with the sides of the horseshoe, permits the sockets to adjust themselves automatically to the position of the sides of the shoe in expanding a hoof, whereby the threaded portions of the adjusting device are prevented from binding and interfering with the adjusting operation. The pivoted plates are also adapted to yield to the adjustment of the sides of the shoe and conform to the hoof, so as to bear perfectly against the walls of the same.

In Figs. 1 and 2 of the accompanying drawings the pivot 3 is located at the center of the front of the shoe; but should it be desired to spread a hoof at one side or quarter only the pivot may be arranged as shown in Figs. 6 and 7 of the drawings. The longer section of the shoe is rigidly nailed to the hoof, and the shorter section is adapted to be forced outward. The adjusting-bar 17 has one end 18 smooth and its other end 19 threaded. The smooth end 18 fits in a smooth socket 20 at the longer side of the shoe, and the threaded end 19 engages a threaded socket 21 at the shorter side of the shoe. The longer side of the shoe affords a bearing for the adjusting device, which is adapted to force the shorter side outward, and thereby expand the desired portion of the hoof.

The invention has the following advantages: The horseshoe is simple and comparatively inexpensive in construction. It is strong and durable, and the adjusting device does not project below the lower face of the shoe, but is housed between the sides of the same in order to prevent it from coming in contact with and being broken or otherwise injured by a hard road-bed. The pivoted plates, which are provided with the flanges, form an adjustable bearing for engaging the walls of a hoof and are adapted to conform to the same. The pivoted sockets are also adapted to adjust themselves automatically to the position of the sides of a hoof and the sides of the shoe to prevent the adjusting device from binding. The shoe is adapted to expand a hoof evenly, or a hoof may be expanded at one side only, if desired.

What I claim is—

1. In a device of the class described, the combination of a shoe composed of two pivotally-connected sections adapted to be expanded, pivotally-mounted flanges projecting from the upper face of the shoe and arranged to bear against the walls of a hoof, said flanges being adapted to yield to the adjustment of the shoe in order to conform to the position of the walls of a hoof, and an adjusting device connecting the sides of the shoe, substantially as described.

2. In a device of the class described, the combination of a shoe composed of two pivotally-connected sections provided at their lower faces with recesses, sockets interposed between the sections of the shoe, provided with rounded inner edges and having outwardly-extending flanges pivoted in the said recesses, the lower faces of the sockets being substantially flush with the lower face of the shoe, and an adjusting-bar connecting the sockets, substantially as described.

3. In a device of the class described, the combination of a shoe composed of two sections pivotally connected and recessed at their upper and lower faces, plates arranged in the upper recesses and provided with upwardly-extending flanges, sockets located between the sections of the shoe and provided with outwardly-extending flanges arranged in the lower recesses, pivots passing through the sections of the shoe and connecting the plates and the sockets and securing them to the shoe, and an adjusting-bar connecting the sockets, substantially as described.

4. In a device of the class described, the combination of a shoe composed of two sections pivoted together at one side of the center of the front of the shoe and being of unequal length, sockets mounted on the sides or sections of the shoe near the rear ends of the same, the socket of the longer side or section being smooth and the other socket being threaded, and an adjusting-bar connecting the sockets and having one end smooth and its other end threaded, substantially as described.

5. In a device of the class described, the combination of a shoe composed of two sections of unequal length pivoted together at one side of the front of the shoe, plates pivoted to the upper faces of the sections and provided with upwardly-extending flanges, sockets pivoted to the sections adjacent to the plates, one of the sockets being smooth and the other being threaded, and an adjusting-bar connecting the sockets and having one end smooth and its other end threaded to agree with the same, substantially as described.

In testimony that I claim the foregoing as my own I have hereto affixed my signature in the presence of two witnesses.

E. S. BARROWS.

Witnesses:
JOHN H. SIGGERS,
ROBT. E. CRUMP.